US012751454B2

(12) United States Patent
Moews

(10) Patent No.: US 12,751,454 B2
(45) Date of Patent: Oct. 6, 2026

(54) BIOCIDAL POLYMER BLEND

(71) Applicant: LANXESS Deutschland GmbH, Cologne (DE)

(72) Inventor: Katrin Moews, Dortmund (DE)

( * ) Notice: Subject to any disclaimer, the term of this patent is extended or adjusted under 35 U.S.C. 154(b) by 327 days.

(21) Appl. No.: 18/706,781

(22) PCT Filed: Oct. 28, 2022

(86) PCT No.: PCT/EP2022/080185
§ 371 (c)(1),
(2) Date: May 2, 2024

(87) PCT Pub. No.: WO2023/078794
PCT Pub. Date: May 11, 2023

(65) Prior Publication Data

US 2026/0150842 A1 Jun. 4, 2026

(30) Foreign Application Priority Data

Nov. 3, 2021 (EP) .................................... 21206207

(51) Int. Cl.
*A01N 47/12* (2006.01)
*A01N 25/22* (2006.01)

(52) U.S. Cl.
CPC ............. *A01N 47/12* (2013.01); *A01N 25/22* (2013.01)

(58) Field of Classification Search
None
See application file for complete search history.

(56) References Cited

U.S. PATENT DOCUMENTS

| | | | |
|---|---|---|---|
| 3,225,013 | A | 12/1965 | Fram et al. |
| 4,490,505 | A | 12/1984 | Pendergrass et al. |
| 5,534,391 | A | 7/1996 | Wang |
| 7,182,789 | B2 | 2/2007 | Decker et al. |
| 9,326,502 | B2 | 5/2016 | Boettcher et al. |
| 9,585,384 | B2 | 3/2017 | Bottcher et al. |
| 2012/0309897 | A1 | 12/2012 | Boettcher |

FOREIGN PATENT DOCUMENTS

EP 2462805 A1 6/2012

OTHER PUBLICATIONS

International Search Report from corresponding International Application No. PCT/EP2022/080185, dated Jan. 19, 2023, three pages.

*Primary Examiner* — Sarah Pihonak
*Assistant Examiner* — Donna M Nestor

(57) ABSTRACT

The invention relates to blends from iodopropargyl compound-containing and nitrogen-containing polymers with at least two beta aminoamine functions, to the preparation of these blends and to the use of these blends for the protection of technical materials from destruction by microorganisms, and to the technical materials finished with these blends.

17 Claims, No Drawings

BIOCIDAL POLYMER BLEND

The invention relates to mixtures of iodopropargyl compounds and nitrogen-containing polymers having at least two beta-aminoamine functions, to the production of these mixtures and to the use of these mixtures for protection of industrial materials against destruction by microorganisms and to the industrial materials treated with these mixtures.

Iodopropargyl compounds, in particular 3-iodo-2-propynyl butylcarbamate (IPBC), are used as biocides for protection of industrial materials, for example wood, from attack, decomposition, destruction and optical alteration by fungi, bacteria and algae. Many iodopropargyl compounds have in common that by themselves in pure form or as a component of an industrial material they undergo decomposition with yellowing on exposure to light, thus massively impairing both the biocidal finish and the haptics of the material to be protected. In addition, these biocides are often used in the presence of transition metal compounds in paints, varnishes and glazes which rapidly destroy iodopropargyl compounds. To reduce the decomposition of these compounds, EP-B 2779830 describes the use of a mixture of nitrogen-containing polymers and iodopropargyl compounds. This mixture makes it possible to stabilize the iodopropargyl compounds in (organic) solvent- and water-based systems with respect to both chemical and light-induced decomposition.

Although the decomposition of the iodopropargyl compounds in the presence of the nitrogen-containing polymers is reduced, it was nevertheless apparent that the storage stability of the mixtures known from EP-B 2779830 is in need of improvement. Just a few days under certain conditions can lead to the formation of polymer-containing phases which can have a technical influence on the uniform effect of the product and are not desired by the customer.

It is accordingly an object of the above invention to provide a mixture where the high stability of the iodopropargyl compounds is preserved and where the formation of the polymer-containing phases is prevented.

It has now surprisingly been found that in the mixtures according to the invention having a specific water content the high stability of the iodopropargyl compounds is retained and the polymer-containing phase formation can be avoided, thus also maintaining the high quality of the mixture.

The invention accordingly provides a mixture containing
at least one nitrogen-containing polymer having at least two beta-aminoamine functions and
at least one iodopropargyl compound and
at least one alkylene glycol
having a water content of 1.5% to 6.0% by weight based on the total amount of the mixture.

The mixtures according to the invention preferably show no phase separation even after 8 weeks of storage. The mixtures particularly preferably show no phase separation for at least one year.

Nitrogen-containing polymers having at least two beta-aminoamine groups are preferably reaction products of aziridines containing one or more unsubstituted or substituted aziridine groups in the presence of water. The aziridine ring is opened by nucleophilic reaction with water, thus forming a beta-amino alcohol. The amino group itself, as a strong nucleophile, can then for example bring about the nucleophilic ring opening of a further aziridine ring, thus forming a dimer containing a beta-aminoamine function which can in turn undergo further reaction to form higher polymers. It is preferable when nitrogen-containing polymers of aziridines containing one or more unsubstituted or substituted aziridine groups are produced by reaction with water.

In this reaction the employed water quantity may be varied over a wide range. Generally at least 10% by weight of water based on the employed aziridines is used. The water quantity is preferably 20% to 1000% by weight, particularly preferably 30% to 300% by weight, based on the employed aziridines.

The reaction temperature is preferably 30° C. to 100° C., particularly preferably 40° C. to 90° C. and yet more preferably 50° C. to 80° C.

It is preferable when the reaction is run until 95% or more, preferably 98% or more, particularly preferably 99% or more, of the employed aziridine have been reacted based on the proportion of aziridine rings. The reaction is very particularly preferably run until no more aziridine rings are detectable.

Accordingly, the nitrogen-containing polymers have a proportion of 5% or less, preferably 2% or less, particularly preferably 1% or less, very particularly preferably no detectable contents, of aziridine rings based on the employed aziridines.

In another embodiment the nitrogen-containing polymers have a proportion of 5% or less, preferably 2% or less, particularly preferably 1% or less, very particularly preferably no detectable contents, of aziridine nitrogen based on the total nitrogen content.

The proportion of unreacted aziridine rings may be determined for example using 13C-NMR spectra compared to the employed aziridine.

The reaction time is generally 2 to 48 h, very preferably 3 to 24 h.

The nitrogen-containing polymers preferably have a weight-average molecular weight of more than 1000 g/mol, particularly preferably 2000 to 100 000 g/mol and very particularly preferably 2000 to 60 000 g/mol determined by gel permeation chromatography against a polystyrene standard (unless otherwise specified: polystyrene/PSS polymer kit).

The nitrogen-containing polymers preferably have a nitrogen content of 1% to 20% by weight, particularly preferably 2% to 15% by weight, of N and very particularly preferably 5% to 12% by weight of N determined by elemental analysis.

Nitrogen-containing polymers are employed in an amount of preferably 1% by weight to 10% by weight, particularly preferably 3% by weight to 7% by weight based on the total amount of the mixture.

Preference is given to aziridine compounds of formula (I)

(I)

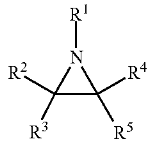

wherein $R^1$ is hydrogen, alkyl or cycloalkyl, each of which are unsubstituted or substituted and/or mono- or polyethylenically unsaturated, or in each case substituted or unsubstituted fullerenyl, aryl, alkoxy, alkoxycarbonyl, arylcarbonyl or alkanoyl, $R^2$, $R^3$, $R^4$ and $R^5$ independently of one another have the same definition as $R^1$ and in addition are independently halogen, hydroxyl, carboxyl, alkylsulfonyl, arylsulfonyl, nitrile, isonitrile and $R^2$ and $R^4$ or $R^3$ and $R^5$ together with the carbon atoms to which they are bonded form a 5- to 10-membered carbocyclic ring that is unsubstituted or substituted and/or mono- or polyethylenically unsaturated.

Suitable monofunctional aziridines of formula (I) include for example those in which $R^2$ and $R^4$ or $R^3$ and $R^5$ together with the carbon atoms to which they are bonded form a 5- to 10-membered carbocyclic ring that is unsubstituted or substituted and/or mono- or polyethylenically unsaturated.

These especially include those of formula (II)

(II)

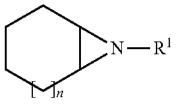

wherein the carbocyclic ring is unsubstituted or substituted by one or more substituents selected from the group consisting of halogen, hydroxyl, oxo, carboxyl, alkylsulfonyl, arylsulfonyl, nitrile, isonitrile, alkyl or cycloalkyl, each of which is unsubstituted or substituted and/or mono- or polyethylenically unsaturated, or substituted or unsubstituted fullerenyl, aryl, alkoxy, alkoxycarbonyl or alkanoyl and n is a number from 0 to 6, preferably from 0 to 1.

Likewise preferred are monofunctional aziridine compounds of formula (I), wherein $R^1$ is a radical of formula

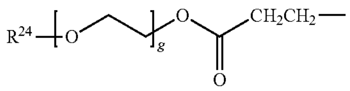

or

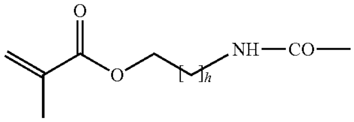

wherein $R^{24}$ is —H or alkyl, preferably —H, —$CH_3$, —$C_2H_5$, particularly preferably —$CH_3$, —$C_2H_5$, g is a number from 1 to 4, preferably 1 to 3, particularly preferably 1 to 2, h is a number from 1 to 11, preferably 1 to 5 and particularly preferably 1 to 3, and the remaining radicals have the above definition.

Especially preferred are compounds of formula (I) which conform to the compound of formula (III) or (IV)

(III)

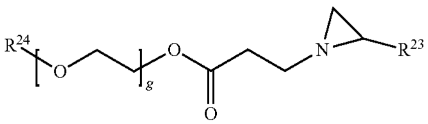

-continued (IV)

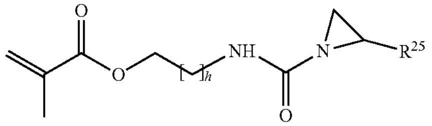

wherein $R^{23}$ is —H or alkyl, preferably —H or —$CH_3$, particularly preferably —$CH_3$, $R^{25}$ is —H or alkyl, preferably —H or —$CH_3$, particularly preferably —$CH_3$, and the remaining radicals have the above definition.

Particularly preferred aziridines are those having two or more aziridine functions. These include for example compounds of formula (V)

(V)

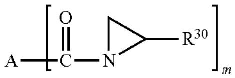

wherein

A is an m-valent aliphatic, cycloaliphatic or aromatic radical which is optionally substituted, m is a number from 2 to 5, in particular 2 to 3, and $R^{30}$ for each m-unit is in each case independently hydrogen or $C_1$-$C_4$-alkyl, in particular $CH_3$ or $CH_2CH_3$.

When m=2, A is preferably $C_2$-$C_{10}$-alkylene, in particular $$—(CH_2)_6)—,\quad —C(CH_3)_2CH_2C(CH_3)_2CH_2— \text{ or }$$

$$—C(CH_3)_2CH_2CH(CH_3)_2CH_2— \text{ or}$$

a phenylene, in particular the bivalent radical of formula

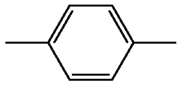

When m=3, A is preferably the trivalent radical of formula

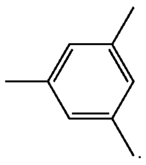

Preference is given to compounds of formula (V) which conform to the formulae (Va)-(Vd).

(Va)

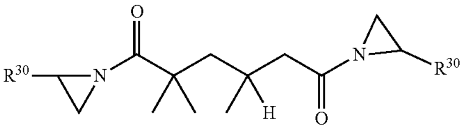

-continued (Vb)

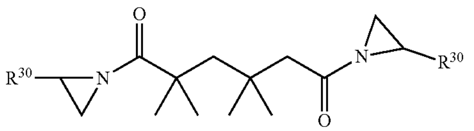

(Vc)

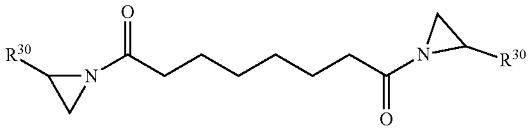

(Vd)

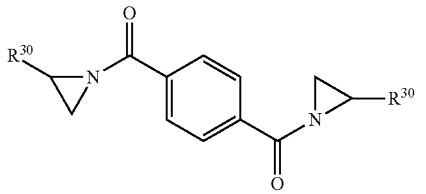

Likewise preferred polyfunctional aziridine compounds are Michael addition products of optionally substituted ethylenimine onto esters of polyhydric alcohols with α,β-unsaturated carboxylic acids and the addition products of optionally substituted ethylenimine onto polyisocyanates.

Suitable alcohol components are for example trimethylolpropane, neopentyl glycol, glycerol, pentaerythritol, 4,4'-isopropylidenediphenol and 4,4'-methylenediphenol. Suitable α,β-unsaturated carboxylic acids include for example acrylic acid, methacrylic acid, crotonic acid and cinnamic acid.

The corresponding polyhydric alcohols of α,β-unsaturated carboxylic acid esters may optionally be alcohols which at their OH functions are in some cases fully extended with alkylene oxides one or more times. This may include for example the abovementioned alcohols extended one or more times with alkylene oxides. In this respect, reference is also made to U.S. Pat. No. 4,605,698, the disclosure of which is hereby incorporated by reference into the present invention. Alkylene oxides particularly suitable according to the invention are ethylene oxide and propylene oxide.

Examples of polyisocyanates suitable for reaction with optionally substituted ethylenimine incude those recited on page 4, lines 33-35 of WO2004/050617 A.

Examples of aziridines suitable according to the invention include those recited on page 3, lines 29-34 of WO2004/050617 A.

Also preferred are aziridines such as those described in U.S. Pat. No. 3,225,013 (Fram), U.S. Pat. No. 4,490,505 (Pendergrass) and U.S. Pat. No. 5,534,391 (Wang).

Likewise preferred are aziridines of formula (I) having at least three aziridine groups, for example trimethylolpropane tris[3-(1-aziridinyl)propionate], trimethylolpropane tris[3-(2-methyl-1-aziridinyl)propionate], trimethylolpropane tris[2-aziridinylbutyrate], tris(1-aziridinyl)phosphine oxide, tris(2-methyl-1-aziridinyl)phosphine oxide, pentaerythritol tris[3-(1-aziridinyl)propionate] and pentaerythritol tetrakis[3-(1-aziridinyl)propionate].

Preferred among these are in particular trimethylolpropane tris[3-(1-aziridinyl)propionate], trimethylolpropane tris[3-(2-methyl-1-aziridinyl)propionate], trimethylolpropane tris[2-aziridinylbutyrate], pentaerythritol tris[3-(1-aziridinyl)propionate] and pentaerythritol tetrakis[3-(1-aziridinyl)propionate].

Preferred in particular are trimethylolpropane tris[3-(1-aziridinyl)propionate], trimethylolpropane tris[3-(2-methyl-1-aziridinyl)propionate] and pentaerythritol tetrakis[3-(1-aziridinyl)propionate].

Likewise preferred are polyfunctional aziridines of formula (VI)

(VI)

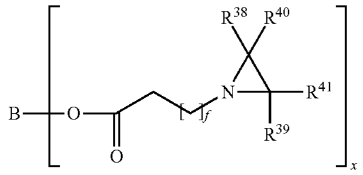

wherein

B is the radical of an aliphatic polyol having at least x OH functions, wherein x OH functions are substituted by the radical in the above brackets, f is a number from 0 to 6, in particular from 1 to 3, x is a number greater than or equal to 2, in particular 2 to 100 000, and $R^{38}$ and $R^{39}$ or $R^{40}$ and $R^{41}$ together with the carbon atoms to which they are bonded form a 5- to 10-membered carbocyclic ring that is unsubstituted or substituted and/or mono- or polyethylenically unsaturated.

B is particularly preferably the radical of a poyvinyl alcohol. Particular preference is given to aziridines of formula (VI), wherein x is 3 or 4 and B is a polyol comprising 3 or 4 OH functions. Particular preference is given to aziridines of formula (VI) which conform to formulae (VIa)-(VIc)

(VIa)

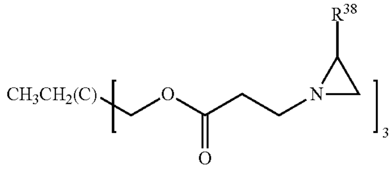

(VIb)

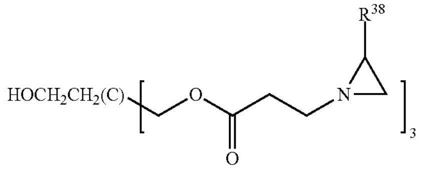

(VIc)

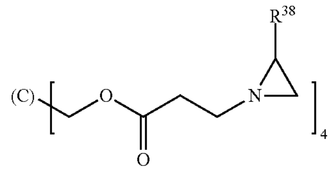

wherein $R^{38}$ is hydrogen or $CH_3$.

Particular preference is given to the aziridine compound of formula (VIa) where $R^{38}$=methyl, known as crosslinker CX-100 from DSM for example, as well as the aziridine of formula (VIa) where $R^{38}$=hydrogen, known as "Corial Hardener AN" from BASF for example.

The iodopropargyl compounds employed are preferably 3-iodo-2-propynyl 2,4,5-trichlorophenyl ether, 3-iodo-2-propynyl 4-chlorophenyl formal (IPCF), N-iodopropargyloxycarbonylalanine, N-iodopropargyloxycarbonylalanine ethyl ester, 3-(3-iodopropargyl)benzoxazol-2-one, 3-(3-iodopropargyl)-6-chlorobenzoxazol-2-one, 3-iodo-2-propynyl alcohol, 4-chlorophenyl 3-iodopropargyl formal, 3-iodo-2-propynyl propylcarbamate, 3-iodo-2-propynyl butylcarbamate (IPBC), 3-iodo-2-propynyl m-chlorophenylcarbamate, 3-iodo-2-propynyl phenylcarbamate, di(3-iodo-2-propynyl) hexyldicarbamate, 3-iodo-2-propynyloxyethanol ethylcarbamate, 3-iodo-2-propynyloxyethanol phenylcarbamate, 3-iodo-2-propynyl thioxothioethylcarbamate, 3-iodo-2-propynyl carbamate (IPC), 3-bromo-2,3-diiodo-2-propenyl ethylcarbamate, 3-iodo-2-propynyl n-hexylcarbamate and 3-iodo-2-propynyl cyclohexylcarbamate or mixtures of these compounds.

The iodopropargyl compounds employed are particularly preferably 3-iodo-2-propynyl propylcarbamate, 3-iodo-2-propynyl butylcarbamate (IPBC), 3-iodo-2-propynyl m-chlorophenylcarbamate, 3-iodo-2-propynyl phenylcarbamate, di(3-iodo-2-propynyl) hexyldicarbamate, 3-iodo-2-propynyloxyethanol ethylcarbamate, 3-iodo-2-propynyloxyethanol phenylcarbamate, 3-iodo-2-propynyl thioxothioethylcarbamate, 3-iodo-2-propynyl carbamate (IPC), 3-bromo-2,3-diiodo-2-propenyl ethylcarbamate, 3-iodo-2-propynyl n-hexylcarbamate and 3-iodo-2-propynyl cyclohexylcarbamate or mixtures of these compounds.

It is yet more preferable when the iodopropargyl compound employed is 3-iodo-2-propynyl butylcarbamate (IPBC).

The iodopropargyl compounds are preferably employed in an amount of 0.01% to 70% by weight, particularly preferably of 0.1% to 50% by weight and very particularly preferably of 15% to 30% by weight based on the total amount of the mixture.

The alkylene glycols employed are preferably mono-, di-, tri-, oligo- or polyalkylene glycols or their etherified derivatives. The alkylene glycols employed are particularly preferably ethylene glycol, diethylene glycol, diethylene glycol butyl ether, triethylene glycol, tetraethylene glycol, polyethylene glycol, propylene glycol, dipropylene glycol, dipropylene glycol monomethyl ether (for example Dowanol® DPM from Dow.) or polypropylene glycol and any desired mixtures of these compounds.

The alkylene glycol employed is very particularly preferably diethylene glycol butyl ether.

The amount of alkylene glycols may be varied over a wide range. Alkylene glycols are preferably employed in an amount of 15% to 80% by weight, particularly preferably in an amount of 55% to 75% by weight, based on the total amount of the mixture.

The alkylene glycols are preferably employed in the production process of the nitrogen-containing polymers and are present in the mixture according to the invention also after this production process. However, the alkylene glycols may also be added to the mixture only retrospectively.

Inorganic or organic acids can also be added to the mixture. The mixtures according to the invention preferably contain acids.

Employable acids include inorganic or organic acids or mixtures of these acids. Preferred inorganic acids preferably include sulfuric acid, nitric acid and phosphoric acid.

Employable organic acids preferably include formic acid, acetic acid, citric acid, propionic acid or benzoic acid. It is particularly preferable to employ organic acids. Formic acid is very particularly preferably employed.

The content of acids may be varied over a wide range. Said content is generally 0.01% to 3% by weight, preferably 0.03% to 1.5% by weight and very particularly preferably 0.05% to 1% by weight based on the total amount of the mixture.

The amount of water in the mixture is preferably 2% to 6% by weight based on the total amount of the mixture.

The mixture preferably has the following composition:

15% to 30% by weight of iodopropargyl compounds
55% to 75% by weight of alkylene glycol
1% to 10% by weight of nitrogen-containing polymer and
1.5% to 6% by weight of water
optionally and preferably 0.01% to 3.0% by weight of acid
based on the total amount of the mixture.

The mixture particularly preferably has the following composition:

15% to 30% by weight of iodopropargyl compounds
55% to 75% by weight of alkylene glycol
1% to 10% by weight of nitrogen-containing polymer and
2% to 6% by weight of water
optionally and preferably 0.01% to 3.0% by weight of acid
based on the total amount of the mixture.

The invention likewise comprises a process for producing the mixtures according to the invention, wherein at least one nitrogen-containing polymer having at least two beta-aminoamine functions is mixed with at least one iodopropargyl compound and at least one alkylene glycol optionally in the presence of at least one acid and the water content is adjusted to an amount of 1.5% to 6% by weight based on the total amount of the mixture.

In one embodiment of the invention the process comprises initially charging the nitrogen-containing polymer having at least two beta-aminoamine functions and subsequently adding the alkylene glycol. This is then preferably followed by addition of the iodopropargyl compound. This is then preferably followed by addition of the acid. The addition of water is preferably carried out after addition of the alkylene glycols.

In a further embodiment of the invention the process preferably comprises initial in-situ production of the nitrogen-containing polymer having at least two beta-aminoamine functions from at least one aziridine and subsequent mixing with the alkylene glycol. The production of the nitrogen-containing polymer with at least two beta-aminoamine functions from aziridines is carried out in the presence of water. The reaction is performed at elevated temperature, preferably at 30° C. to 100° C. It is possible to carry out the production in such a way that a corresponding small amount of water is employed in the reaction or the amount of water is reduced after the reaction. It is preferable to employ a greater amount of water during the reaction and to reduce this again after the reaction. This reducing is preferably carried out by distillation. This is preferably followed by addition of the alkylene glycol. This is preferably followed by addition of the iodopropargyl compound. The addition of the acids is preferably carried out after addition of the iodopropargyl compound.

In a further embodiment the invention also comprises a process for producing the mixtures according to the invention, wherein in a step a)
at least one aziridine is reacted in the presence of water and at least one alkylene glycol and
in a step b)
the water is removed down to a concentration of 1.5% to 6% by weight based on the total amount of the mixture to be produced in step b) and in a step c) at least one iodopropargyl compound and at least one acid, optionally in the presence of at least one further alkylene glycol which may be the same as or different to the alkylene glycol employed in step a), are added.

Step a) comprises initially charging the aziridines with the water and subsequently adding the alkylene glycols. This is followed by adjustment of the reaction temperature and preferably stirring.

In a further preferred embodiment according to the invention a portion of the alkylene glycols in step a) is added only after termination of the reaction. It is preferable when a portion of the alkylene glycols is added before elevation of the temperature to the reaction temperature and a further portion is added after completion of the reaction. It is particularly preferable when 10% to 20% by weight based on the total amount of alkylene glycols are employed before elevation of the temperature to reaction temperature in step a) and 80% to 90% by weight are employed after completion of the reaction. Step b) then preferably comprises removing the water down to a content of 1.5% by weight to 6% by weight, preferably by distillation. It is preferable when the entire amount of employed alkylene glycol is employed/added to the solution in step a) before the removal of the water in step b).

After performance of step a) a step b) comprises removing the water, preferably by distillation, down to a concentration of 1.5% by weight to 6% by weight. It is particularly preferable when the water is removed down to a concentration of 2% by weight to 6% by weight.

The water content could also be reduced by addition of a drying agent, such as preferably silica gel or phosphorus pentoxide. The water is preferably reduced by distillation at subatmospheric pressure. The pressure is preferably between 1 mbar and 450 mbar, particularly preferably between 50 mbar and 300 mbar, during reduction of the water amount. The water for distillative removal is then heated to boiling point by increasing the temperature.

The iodopropargyl compound and the acid are then preferably added in a step c).

The amount of iodopropargyl compounds employable in step c) is preferably 0.01% to 70% by weight, particularly preferably 0.1% to 50% by weight and very particularly preferably 15% by weight to 30% by weight based on the total amount of the mixture in step c).

The content of acids may be varied over a wide range. It is generally 0.01% to 3% by weight, preferably 0.03% to 1.5% by weight and very particularly preferably 0.05% to 1% by weight based on the total amount of the mixture in step c). Alkylene glycols may moreover be added to the mixture from step b) in step c). These may be the same as or different to the alkylene glycols employed in step a). It is preferable to employ the same alkylene glycols in step c). It is preferable to employ alkylene glycols in step a). If alkylene glycols are employed in step c) the amount thereof is preferably 70% to 90% by weight based on the alkylene glycols employed in step a).

It is possible to add further active ingredients and auxiliaries to the mixtures according to the invention. The further active ingredients and/or auxiliaries are preferably added in step c).

It is possible to add for example organic solvents, such as aromatics, such as xylene, toluene or alkylnaphthalenes, chlorinated aromatics or chlorinated aliphatic hydrocarbons, such as chlorobenzenes, chloroethylenes or methylene chloride, aliphatic hydrocarbons, such as cyclohexane or paraffins, such as preferably petroleum fractions (petroleum spirit, Shellsol D60 from Shell Chemical), monohydric alcohols, such as preferably ethanol, isopropanol and butanol, polyhydric alcohols, such as preferably glycerol, pentaerythritol, polyvinyl alcohol (for example Poval® from Kuraray), ethers and esters of alcohols (such as Texanol® from Eastman), ketones, such as preferably acetone, methyl ethyl ketone, methyl isobutyl ketone or cyclohexanone, highly polar aprotic solvents, for example dimethylformamide and dimethylsulfoxide, esters of monobasic and polybasic carboxylic acids, for example diisobutyl adipate, diisobutyl maleate (for example Rhodiasolv DIB®).

It is also possible to add to the mixtures according to the invention further ingredients, such as adhesives, such as carboxymethylcellulose, natural and synthetic powdery, granular or latex-type polymers, such as gum arabic, polyvinyl alcohol, polyvinyl acetate, natural phospholipids, such as cephalins and lecithins, synthetic phospholipids and mineral and vegetable oils.

It is also possible to add to the mixtures according to the invention as further ingredients colorants such as inorganic pigments, for example iron oxide, titanium oxide, Prussian blue and organic dyes, such as alizarin, azo and metal phthalocyanine dyes.

It is also possible to add stabilizers, for example chelating reagents or organic epoxides, to the mixtures according to the invention.

The efficacy and spectrum of action of the mixtures according to the invention can be increased if optionally further active ingredients selected from the group of further antimicrobial compounds, fungicides, bactericides, herbicides, insecticides or other active ingredients are added.

The mixtures according to the invention are especially suitable for biocidal treatment of industrial materials, such as in particular coating compositions, for example paints, lacquers, primers, impregnations, glazes. Use thereof is usually effected in binder formulations, such as are described for example in EP-B 2779830.

The mixtures according to the invention moreover have a high material protection effect and no longer exhibit polymer phase formation even after several weeks of storage. The invention further relates to the use of the mixtures according to the invention for protection of industrial materials against destruction or attack by microorganisms.

The mixtures according to the invention are suitable for biocidal treatment of industrial materials. Industrial materials in the present context are understood to be non-living materials that have been prepared for use in industry. The industrial materials include for example adhesives, glues, paper and card, textiles, leather, wood, wood-based materials, coating compositions and plastics articles, cooling lubricants and other materials that may be subject to attack or decomposition by microorganisms.

Microorganisms which can bring about a degradation or a change in the industrial materials are for example bacteria, fungi, yeasts, algae and mucosa organisms. It is preferable when the active ingredients according to the invention are active against fungi, in particular mold fungi, wood-discolouring and wood-destroying fungi (basidiomycetes) as well as against mucosa organisms and bacteria.

These include for example microorganisms of the following genera:

*Alternaria*, such as *Alternaria tenuis,*
*Aspergillus*, such as *Aspergillus niger,*
*Chaetomium*, such as *Chaetomium globosum,*
*Coniophora*, such as *Coniophora puteana,*
*Lentinus*, such as *Lentinus tigrinus,*
*Penicillium*, such as *Penicillium glaucum,*

*Polyporus*, such as *Polyporus versicolor,*
*Aureobasidium*, such as *Aureobasidium pullulans,*
*Sclerophoma*, such as *Sclerophoma pityophila,*
*Trichoderma*, such as *Trichoderma viride,*
*Escherichia*, such as *Escherichia coli,*
*Pseudomonas*, such as *Pseudomonas aeruginosa*, and
*Staphylococcus*, such as *Staphylococcus aureus.*

The invention also encompasses the industrial materials containing the mixtures according to the invention.

The invention is hereinbelow elucidated with reference to examples but without being limited thereto.

EXAMPLES

Example 1

Preparation of an Inventive Biocidal Composition

Step a): 30 g of trimethylolpropane tris[3-(2-methyl-1-aziridinyl)propionate] (Crosslinker CX-100 from DSM) were initially charged in 75 ml of water (250% by weight based on the aziridine/water content based on the mixture: 19.2% by weight) and admixed with 45 g of butyl diglycol with stirring with a magnetic stirrer. The mixture was then stirred at 80° C. for 6 h. A clear, slightly yellowish solution was obtained. This solution was admixed with another 239 g of butyl diglycol (total amount 73% by weight based on the mixture) with stirring. Step b): Water was subsequently distilled off at a constant 150 mbar and 3 samples were taken in the 10 intervening time (see table 1).

TABLE 1

| Sampling | |
|---|---|
| Sample | Experimental conditions in step c) |
| Sample 1 | 50.42 g of sample 1 were admixed with 11.6 g of IPBC and 0.2% formic acid (0.12 g). |
| Sample 2 | 47.93 g of sample 2 were admixed with 11 g of IPBC and 0.2% formic acid (0.11 g). |
| Sample 3 | 49.54 g of sample 3 were admixed with 11.4 g of IPBC and 0.2% formic acid (0.12 g). |
| Sample 4 | 171.8 g of final sample were admixed with 39.64 g of IPBC and 0.2% formic acid (0.42 g). |

TABLE 2

| Results | | | |
|---|---|---|---|
| Sample | 3-iodo-2-propynyl butylcarbamate content | Water content | Phase |
| 1 | 18.8% | 9.30% | cloudy/rapid phase formation (1-2 days) |
| 2 | 18.8% | 7.10% | cloudy/rapid phase formation (1-2 days) |
| 3 | 18.9% | 5.00% | 22 weeks without a phase |
| 4 | 18.6% | 1.87% | at least 33 weeks without a phase |

Water content was determined by Karl-Fischer titration and is reported in % by weight. IPBC content was determined by HPLC and is reported in % by weight.

Similarly to example 1 the inventive mixtures with different water contents were produced and stored for 3 months at 40° C. The content of 3-iodo-2-propynyl butylcarbamate (IPBC) was measured by HPLC at commencement of storage and after 3 months to determine active ingredient decomposition.

TABLE 3

| Sample | Water content (% by weight) | IPBC decomposition after 3 months at 40° C. |
|---|---|---|
| 1 | 5.0% | 21% |
| 2 | 1.9% | 27% |
| 3 | 1.1% | 40% |

Below a content of 1.5% by weight of water in the phase-free mixture according to claim 1 the stability of IPBC is no longer sufficient on prolonged storage. A content of water above 6% by weight in the mixture according to claim 1 results in phase formation which necessitates further treatments, such as stirring, to utilize the product and therefore entails the use of a further process step and is therefore technically and economically disadvantageous.

Determination of Molecular Weight:

25 g of a sample produced according to step a) above was freed of water at 50° C. under an oil pump vacuum (about 0.35 mbar). 12.85 g of a highly viscous oil was obtained. 1 g of this oil was mixed 3 times with respective 5 g portions of THF and the residue was dried overnight in a desiccator and then analyzed by GPC (standard: polystyrene/PSS polymer kit). A polymer having an average molecular weight of 12 238 g/mol was identified. Only butyl diglycol as the sole component was detectable in the THF washing fluid with GC-MS.

Aziridine functionalities were not detectable.

Example 2

Preparation of an Inventive Biocidal Composition

Step a): 10 g of trimethylolpropane tris[3-(2-methyl-1-aziridinyl)propionate] (Crosslinker CX-100 from DSM) were initially charged in 25 ml of water (water content based on the total mixture: 14.5% by weight) and admixed with 15 g of butyl diglycol with stirring with a magnetic stirrer. The mixture was then stirred at 80° C. for 6 h. A clear, slightly yellowish solution was obtained. This solution was admixed with another 79.9 g of butyl diglycol (total amount 46.1% by weight based on the total mixture) with stirring. Step b): Water was then distilled off at a constant 150 mbar until the water content was below 4%.

Step c): The remaining 104.6 g were admixed with 34.9 g of IPBC and 0.29 g of formic acid.

Water content determined by Karl-Fischer titration: 3.35%

IPBC: 25.3% IPBC

Average molecular weight of the polymer from step a) determined according to example 1:15 966 g/mol.

The product did not have a phase after 16 weeks.

Comparative Example 1 (Noninventive)

Production of a Biocidal Composition without Water Reduction 10 g of trimethylolpropane tris[3-(2-methyl-1-aziridinyl) propionate] (Crosslinker CX-100 from DSM) were initially charged in 25 ml of water (14.5% by weight based on the total amount of the mixture) and admixed with 15 g of butyl diglycol with stirring with a magnetic stirrer. The mixture was then stirred at 80° C. for 6 h. A solution that was clear and slightly yellowish after cooling was obtained. This solution was admixed with a further 79.7 g of butyl diglycol and 42.8 g of IPBC (iodopropargyl butylcarbamate) with stirring. 0.33 g of formic acid were then added. The finished technical concentrate was light-yellow but cloudy and had an IPBC content of 25.8%. The water content is 13.1% by weight based on the total amount of the mixture. Water content was determined by Karl-Fischer titration and is reported in % by weight.

A phase had formed after 2 days. This was decanted off. After 1 week of storage a phase had again formed.

What is claimed is:

1. A mixture containing at least one nitrogen-containing polymer having at least two beta-aminoamine functions and at least one iodopropargyl compound and at least one alkylene glycol having a water content of 1.5% to 6.0% by weight based on the total amount of the mixture.

2. The mixture as claimed in claim 1, wherein the nitrogen-containing polymers have a weight-average molecular weight of 2000 to 100000 g/mol determined by gel permeation chromatography against a polystyrene standard.

3. The mixture as claimed in claim 1, wherein the nitrogen-containing polymers have a nitrogen content of 1% to 20% by weight determined by elemental analysis.

4. The mixture as claimed in claim 1, wherein the nitrogen-containing polymers are produced from at least one aziridine containing one or more unsubstituted or substituted aziridine groups by reaction with water.

5. The mixture as claimed in claim 4, wherein the at least one aziridine is at least one aziridine of formula (I)

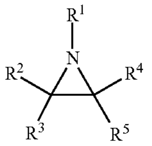

(I)

wherein $R^1$ is hydrogen, alkyl or cycloalkyl, each of which are unsubstituted or substituted and/or mono- or polyethylenically unsaturated, or in each case substituted or unsubstituted fullerenyl, aryl, alkoxy, alkoxycarbonyl, arylcarbonyl or alkanoyl, $R^2$, $R^3$, $R^4$ and $R^5$ independently of one another have the same definition as $R^1$ or are independently halogen, hydroxyl, carboxyl, alkylsulfonyl, arylsulfonyl, nitrile, isonitrile and $R^2$ and $R^4$ or $R^3$ and $R^5$ together with the carbon atoms to which they are bonded form a 5- to 10-membered carbocyclic ring that is unsubstituted or substituted and/or mono- or polyethylenically unsaturated.

6. The mixture as claimed in claim 4, wherein the at least one aziridine is trimethylolpropane tris[3-(1-aziridinyl) propionate], trimethylolpropane tris[3-(2-methyl-1-aziridinyl) propionate], trimethylolpropane tris[2-aziridinylbutyrate], pentaerythritol tris[3-(1-aziridinyl) propionate] or pentaerythritol tetrakis[3-(1-aziridinyl) propionate].

7. The mixture as claimed in claim 1, wherein the amount of nitrogen-containing polymers is 3% to 7% by weight.

8. The mixture as claimed in claim 1, wherein the at least one iodopropargyl compound is selected from the group of 3-iodo-2-propynyl propylcarbamate, 3-iodo-2-propynyl butylcarbamate (IPBC), 3-iodo-2-propynyl m-chlorophenylcarbamate, 3-iodo-2-propynyl phenylcarbamate, di(3-iodo-2-propynyl) hexyldicarbamate, 3-iodo-2-propynyloxyethanol ethylcarbamate, 3-iodo-2-propynyloxyethanol phenylcarbamate, 3-iodo-2-propynyl thioxothioethylcarbamate, 3-iodo-2-propynyl carbamate (IPC), 3-bromo-2,3-diiodo-2-propenyl ethylcarbamate, 3-iodo-2-propynyl n-hexylcarbamate and 3-iodo-2-propynyl cyclohexylcarbamate.

9. The mixture as claimed in claim 1, wherein the iodopropargyl compound is 3-iodo-2-propynyl butylcarbamate (IPBC).

10. The mixture as claimed in claim 1, wherein the at least one alkylene glycol is ethylene glycol, diethylene glycol, diethylene glycol butyl ether, triethylene glycol, tetraethylene glycol, polyethylene glycol, propylene glycol, dipropylene glycol, dipropylene glycol monomethyl ether, polypropylene glycol or any desired mixture of these compounds.

11. The mixture as claimed in claim 1, wherein the at least one alkylene glycol is are employed in the mixture in an amount of 55% to 75% by weight.

12. The mixture as claimed in claim 1, wherein the mixture contains at least one acid.

13. The mixture as claimed in claim 12, wherein the at least one acid is are employed in an amount of 0.01% to 3% by weight.

14. The mixture as claimed in claim 1, wherein the water content is 2% to 6% by weight based on the total amount of the mixture.

15. A process for producing the mixture as claimed in claim 1, comprising mixing at least one nitrogen-containing polymer having at least two beta-aminoamine functions with at least one iodopropargyl compound and at least one alkylene glycol optionally in the presence of at least one acid and adjusting the water content to an amount of 1.5% to 6% by weight based on the total amount of the mixture.

16. A method of protecting an industrial material against destruction or attack by microorganisms, comprising treating the industrial material with the mixture as claimed in claim 1.

17. An industrial material comprising the mixture as claimed in claim 1.

* * * * *